(12) United States Patent
Hilt

(10) Patent No.: US 10,661,154 B2
(45) Date of Patent: May 26, 2020

(54) LOCOMOTION DEVICE WITH ROLLERS

(71) Applicant: COMMISSARIAT A L'ENERGIE ATOMIQUE ET AUX ENERGIES ALTERNATIVES, Paris (FR)

(72) Inventor: Thierry Hilt, La Terrasse (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/314,579

(22) PCT Filed: Jun. 30, 2017

(86) PCT No.: PCT/FR2017/051767
§ 371 (c)(1),
(2) Date: Dec. 31, 2018

(87) PCT Pub. No.: WO2018/007727
PCT Pub. Date: Jan. 11, 2018

(65) Prior Publication Data
US 2019/0168105 A1    Jun. 6, 2019

(30) Foreign Application Priority Data

Jul. 4, 2016 (FR) ...................... 16 56376

(51) Int. Cl.
*A63C 17/14* (2006.01)
*A63C 17/06* (2006.01)
(Continued)

(52) U.S. Cl.
CPC .......... *A63C 17/1427* (2013.01); *A63C 17/06* (2013.01); *F16H 1/225* (2013.01); *F16H 7/06* (2013.01)

(58) Field of Classification Search
CPC .............. A63C 17/064; A63C 17/1409; A63C 17/1427; A63C 17/06; A63C 17/0033; A63C 17/14; A63C 2203/52
See application file for complete search history.

(56) References Cited

U.S. PATENT DOCUMENTS

| 3,827,706 A | 8/1974 | Milliman |
| 5,397,138 A | 3/1995 | Mangelsdorf |
(Continued)

FOREIGN PATENT DOCUMENTS

| DE | 29 06 725 A1 | 9/1980 |
| DE | 102 44 064 A1 | 3/2004 |
(Continued)

OTHER PUBLICATIONS

International Search Report dated Oct. 16, 2017 in PCT/FR2017/051767 filed Jun. 30, 2017.

*Primary Examiner* — Brian L Swenson
(74) *Attorney, Agent, or Firm* — Oblon, McClelland, Maier & Neustadt, L.L.P.

(57) ABSTRACT

This locomotion device includes a mechanism suitable for converting the pivoting of a roller into a movement of a pad to an advanced position in which it brakes this roller, this mechanism includes a planetary gear set having: a planetary wheel attached to a sole and the axis of revolution of which coincides with a pivoting axis of the roller and a satellite gear rotated by the planetary wheel about an axis of revolution attached without any degree of freedom to the roller and a pin movable by the satellite gear between: a near position in which it pushes and maintains the pad in an advanced position and a distant position in which it allows the movement of the pad from its advanced position to a retracted position.

9 Claims, 6 Drawing Sheets

(51) Int. Cl.
 *F16H 1/22* (2006.01)
 *F16H 7/06* (2006.01)

(56) References Cited

U.S. PATENT DOCUMENTS

| | | | | |
|---|---|---|---|---|
| 6,105,977 | A * | 8/2000 | Bengtsson | A63C 17/0033 |
| | | | | 280/11.227 |
| 6,254,109 | B1 * | 7/2001 | Horton | A63C 17/1409 |
| | | | | 280/11.211 |
| 6,871,860 | B1 * | 3/2005 | Esse ya | A63C 17/0046 |
| | | | | 280/11.224 |
| 2002/0079662 | A1 | 6/2002 | Lee | |
| 2002/0153205 | A1 | 10/2002 | Zinanti | |
| 2003/0146586 | A1 * | 8/2003 | Hurwitz | A63C 17/0066 |
| | | | | 280/11.221 |
| 2005/0035563 | A1 * | 2/2005 | Krivulin | A63C 17/06 |
| | | | | 280/11.211 |
| 2005/0146100 | A1 * | 7/2005 | Hurwitz | A63C 17/0066 |
| | | | | 280/11.223 |
| 2005/0151332 | A1 * | 7/2005 | Chen | A63C 17/0073 |
| | | | | 280/11.221 |
| 2007/0096409 | A1 | 5/2007 | Harper | |
| 2008/0265533 | A1 * | 10/2008 | Perkovich | A63C 17/062 |
| | | | | 280/11.221 |
| 2016/0250545 | A1 * | 9/2016 | Yurkin | A63C 17/008 |
| | | | | 280/11.223 |
| 2016/0296828 | A1 * | 10/2016 | Ewing, Jr. | A63C 17/1427 |

FOREIGN PATENT DOCUMENTS

| | | |
|---|---|---|
| FR | 2 544 621 A1 | 10/1984 |
| FR | 2 862 232 A1 | 5/2005 |
| JP | 2014-76144 A | 5/2014 |
| WO | WO 02/43821 A2 | 6/2002 |

\* cited by examiner

LOCOMOTION DEVICE WITH ROLLERS

The invention relates to a locomotion device with rollers for travel on a ground.

Many locomotion devices with rollers are known such as, for example, roller skates. However, braking with roller skates or any other similar locomotion device, such as skateboards, roller skis or even scooters, requires great dexterity and needs many hours of practice before being perfectly mastered. In fact, for this purpose, the rollers are often made to slide on the ground.

Various improvements have already been conceived to eliminate this disadvantage. For example, application US2002153205, known hereinafter as US205, describes a locomotion device, and more particularly roller skates. These roller skates each comprise:
- a sole which extends mainly on a plane known as the "sole plane", and on which at least one of the feet of the user is intended to be supported during use of the device by this user;
- at least one roller which is mechanically connected to the sole in order to roll on the ground, this roller being fitted such as to rotate around a rolling axis parallel to the plane of the sole, and also around an axis of pivoting perpendicular to the plane of the sole; and
- a braking device which can exert a braking torque on the roller, the amplitude of which varies according to a turning angle, the turning angle being the angle between: a longitudinal axis of the sole, this longitudinal axis being set without any degree of freedom for the sole, and contained on the plane of the sole; and the orthogonal projection, on the plane of the sole, of the instantaneous direction of displacement of this sole.

The device according to US205 has several advantages, including in particular:
1. Making it possible to brake without needing to make the roller slide; and
2. Imitating the behavior of ice skates or skis, i.e. triggering the braking by putting the sole so that it is angled relative to the instantaneous direction of travel of the device.

The second advantage is particularly useful since it makes it considerably easier to learn how to brake the locomotion device.

More specifically, in the device according to US205, the roller is a ball, and the braking torque is obtained by friction of pads on this ball. The pads are placed on a rolling axis which passes via the center of the ball. The friction, and therefore the braking torque, occurs only if the ball is rolling in a direction which is not co-linear with this rolling axis, i.e. if the turning angle is not zero. In the device according to US205, the braking is carried out by means of friction between the pads and the ball. With this device, it is difficult to control the braking torque accurately according to the turning angle.

The following documents are also known in the prior art:
JP2014076144A,
U.S. Pat. No. 5,397,138A,
DE2906725A1,
FR2544621A1; and
U.S. Pat. No. 3,827,706A.

Some of these documents disclose a braking device with a cable for the roller. More specifically, it is the tension exerted on the cable which makes it possible to displace a pad between an advanced position, in which it exerts pressure on the roller in order to brake it, and a retracted position in which it does not exert any pressure on the roller. These braking devices with cables are cumbersome.

The objective of the invention is thus to propose a locomotion device which has the same advantages as the device according to US205, whilst making possible more accurate control of the braking torque according to the turning angle, and having a limited size. Its subject is therefore a locomotion device of this type according to claim 1.

The device claimed has the same advantages as those of US205. In fact, the fact that the roller can pivot around the axis of pivoting makes it possible to limit the sliding of this roller during the braking, or even prevent it. In addition, the fact that the braking torque exerted depends on the amplitude of the turning angle also makes it possible to approximate the behavior of a skate, a snowboard or a ski.

Use of a planetary gear set makes it possible to transform the pivoting of the roller around its axis of pivoting into displacement of the pad, whilst maintaining a limited size. For example, in comparison with braking devices which use a taut cable, for identical clearance of the pad, the size of the planetary gear set is smaller than the size of the braking device with a cable. In particular, unlike the known braking device with a cable, the braking device claimed does not need to have significant offsetting between the rolling axis and the axis of pivoting of the roller.

The embodiments of this locomotion device may comprise one or a plurality of the characteristics of the dependent claims.

These embodiments of the locomotion device also have the following advantages:
- The fact that the pad rubs on the lateral flank of the roller makes the braking torque independent from the wear of the tread, which facilitates its control.
- The fact of using a chain or belt to rotate the satellite gear makes the planetary gear set stronger in relation to dirt which could be introduced between the teeth of the wheels. In particular, this makes it unnecessary to use a casing to protect the planetary gear set against dirt.
- The fact that the diameter of the planetary wheel is equal to twice the diameter of the satellite gear allows the roller to turn several times around itself, around its axis of pivoting.
- The fact of interposing a spring between the pin and the runner makes it possible to control accurately the transformation of the displacement of the pin into a pressure exerted by the runner on the roller.
- The use of a controllable electromechanical device for turning of the roller makes it possible to keep the roller aligned on the instantaneous direction of displacement of the pad, even when this roller is no longer touching the ground. This therefore prevents jerking and uncontrolled braking which occurs when a roller touches the ground again after having been raised. This therefore facilitates the use of the locomotion device.
- The use of an endless screw engaged with a notched wheel to make the roller pivot around its axis of pivoting makes it possible to maintain the angle of pivoting of the roller without consumption of electrical energy, or whilst minimizing its consumption.

The invention will be better understood by reading the following description, provided purely by way of non-limiting example, and with reference to the appended drawings in which.

In these figures, the same references are used to designate the same elements. Hereinafter in this description, the characteristics and functions which are well known to persons skilled in the art are not described in detail.

Figure 1:
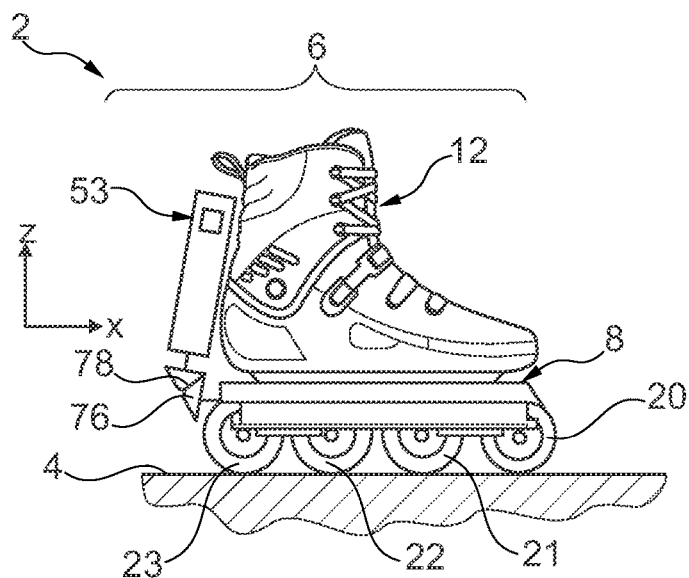
FIG. 1 is a schematic illustration in side view of part of a locomotion device.

FIG. 1 represents part of a locomotion device 2. The device 2 allows a person, known hereinafter as the user, to travel by rolling on the ground 4. In this case, the surface of the ground 4 is flat, and extends on a horizontal plane known as the plane of the ground. The device 2 is light enough to be transported directly by hand by its user. For example, the device 2 weighs less than 25 kg, or less than 15 kg, and preferably less than 10 kg. Its size is also limited. For example, its volume is less than 50 cm$^3$. In this embodiment, the device 2 is without propulsion means, i.e. a thermal or electric engine which can propel the device 2 and its user on the ground 4.

By way of illustration, the device 2 is described in the particular case where it is composed of two roller skates. Each of these skates is designed to be worn on a respective foot of the user. In order to simplify FIG. 1 and the following figures, only the right skate 6 is represented. The left skate of the device 2 is deduced by symmetry with the right skate.

Figure 2:
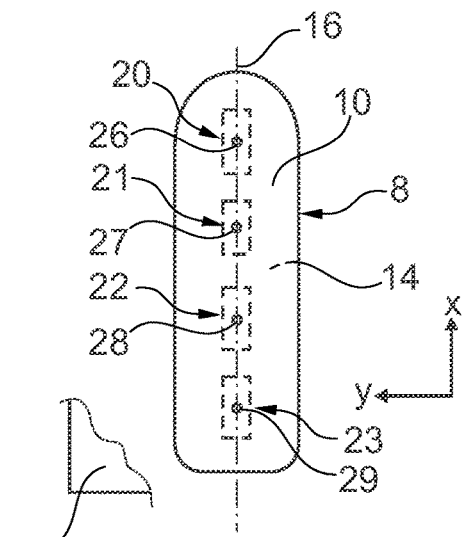
FIG. 2 is a schematic illustration from above of a sole of the device in FIG. 1.

The skate 6 comprises a sole 8 which extends mainly on a horizontal plane S (FIG. 2) known as the sole plane. In FIGS. 1 and 2, this plane S is parallel to the ground 4.

Hereinafter, all the figures are oriented relative to an orthogonal reference XYZ which is set without any degree of freedom for this sole 8. The directions X and Y are contained on the plane S.

The sole 8 is described in greater detail with reference to FIGS. 1 and 2. The sole 8 is made of a rigid material which is deformed very little under the weight of the user. For example, the maximum amplitude of its deformation in the direction Z between a situation where the weight of the user is supported on this sole 8, and a situation where the user is absent, is strictly less than 10 cm, and generally less than 1 cm or 5 mm for applications of the roller skate type. The sole 8 comprises an upper face 10 (FIG. 2) on which the right foot of the user is supported during use of the device.

The skate 6 comprises an attachment device 12, to attach the foot of the user to the face 10 of the sole 8, such that the user can raise the skate 6 by lifting his foot. In the particular case represented here, the attachment device 12 is a shoe inside which the user can insert his foot. However, any other attachment device may be suitable, such as, for example, straps or loops which make it possible to attach the foot on the face 10 of the sole 8.

The sole 8 also comprises a lower face 14 (FIG. 2) which is opposite the face 10, and on which rollers are secured.

Typically, the orthogonal projection of the sole 8 in the plane S defines a form which is longer than it is wide. The longitudinal axis 16 of the sole 8 is defined as being the axis which passes via the center of this orthogonal projection of the sole 8 in the plane S, and which is parallel to the largest side of the rectangle with the smallest surface area which contains this orthogonal projection entirely. The center of an object is defined here as being the barycenter of all the points of this object, with allocation of the same weighting to each of its points. In this case, the direction X of the reference XYZ is parallel to the axis 16. The transverse axis of the sole 8 is an axis which is contained in the plane S, and is parallel to the direction Y.

In this embodiment, the skate 6 comprises four rollers 20 to 23. Each roller is fitted such as to rotate around a respective rolling axis passing via its center. The rolling axes are always parallel to the plane S. In FIGS. 1 and 2, the rollers 20 to 23 are represented in a particular position, known hereinafter as the "aligned position". In the aligned position, the rolling axes of each of the rollers 20 to 23 are all perpendicular to the axis 16. In addition, in this aligned position, the braking torque which is exerted on each of these rollers is minimum, and preferably zero. In this embodiment, in the aligned position, the rollers 20 to 23 are aligned one behind another along the axis 16. The rollers 20 and 23 are rollers which are respectively the furthest to the front and the furthest to the rear in the direction X.

Each roller 20 to 23 can also be rotated around a respective axis of pivoting parallel to the direction Z. In FIG. 2, these axes of pivoting of the rollers 20 to 23 have respectively the numerical references 26 to 29.

In this embodiment, by way of illustration, with the exception of their position relative to one another below the sole 8, these rollers 20 to 23 are structurally identical to one another. Thus, only the roller 20 is described in greater detail with reference to FIG. 3.

Figure 3:
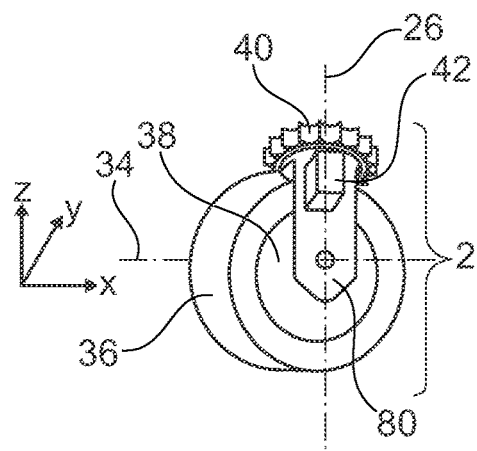
FIG. 3 is a schematic illustration in perspective of a roller of the device in FIG. 1 equipped with a braking device.

In FIG. 3, the rolling axis of the roller 20 has the reference 34. The roller 20 has a tread 36 which is designed to come into contact directly on the ground 4 when the roller 20 is rolling on this ground 4. The tread 36 is often made of polymer, and preferably of a polymer material which has a high coefficient of friction. In this case, on each side of the tread 36, the roller 20 also has vertical flanks 38 which do not come directly into contact with the ground 4.

In this embodiment, the axis 34 intersects the axis 26 at the center of the roller 20. In other words, the shortest distance $\Delta$ between the axis 34 and the axis 26 is permanently zero.

The roller 20 also comprises a notched wheel 40 which is fitted such as to rotate around the axis 26. More particularly, the axis of revolution of this wheel 40 coincides with the axis 26. The notched wheel 40 is secured without any degree of freedom on the axis 34 by means of a fork 80, and thus pivots at the same time as this axis 34 around the axis 26.

Finally, the roller 20 is associated with a braking device 42 which can brake the roller 20 according to its turning angle $\alpha_B$. This device 42 is described in greater detail with reference to FIGS. 8 to 13.

Figure 4:
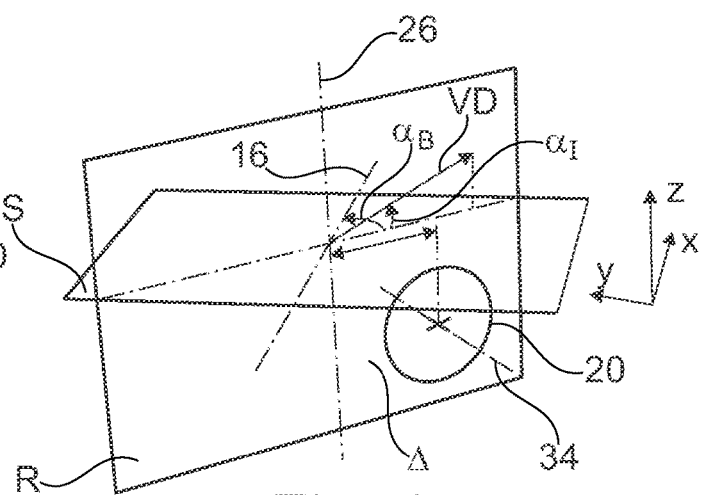
FIG. 4 is a schematic illustration of different planes and axes of the device in FIG. 1, used to define a turning angle $\alpha_B$ and an angle of inclination $\alpha_I$.

FIG. 4 is used to define what is designated as the "turning angle $\alpha_B$" and "angle of inclination $\alpha_I$" of the sole 8. This figure is represented in the particular case where the distance Δ is not zero. However, everything which is described in this particular case also applies to the case where the distance Δ is zero. In order to simplify this FIG. 4, only the roller 20 is schematically represented by a circle. In this figure, the plane S and the axes 16, 26 and 34 correspond to the plane and the axes previously defined. The instantaneous direction of displacement VD of the sole 8 is also represented by a vector. The angle $\alpha_B$ is the angle between the axis 16 and the orthogonal projection of the direction VD on the plane S. The angle $\alpha_I$ is the angle between the plane S and the direction VD.

The rolling plane R of the roller 20 is the plane which passes via the center of the roller 20 and is perpendicular to its rolling axis 34. As will be seen hereinafter, the pivoting of the roller 20 around its axis 26 is controlled in order to keep the plane R permanently parallel to the direction VD, so as to prevent the roller 20 from sliding on the ground 40 during braking.

Figure 5:
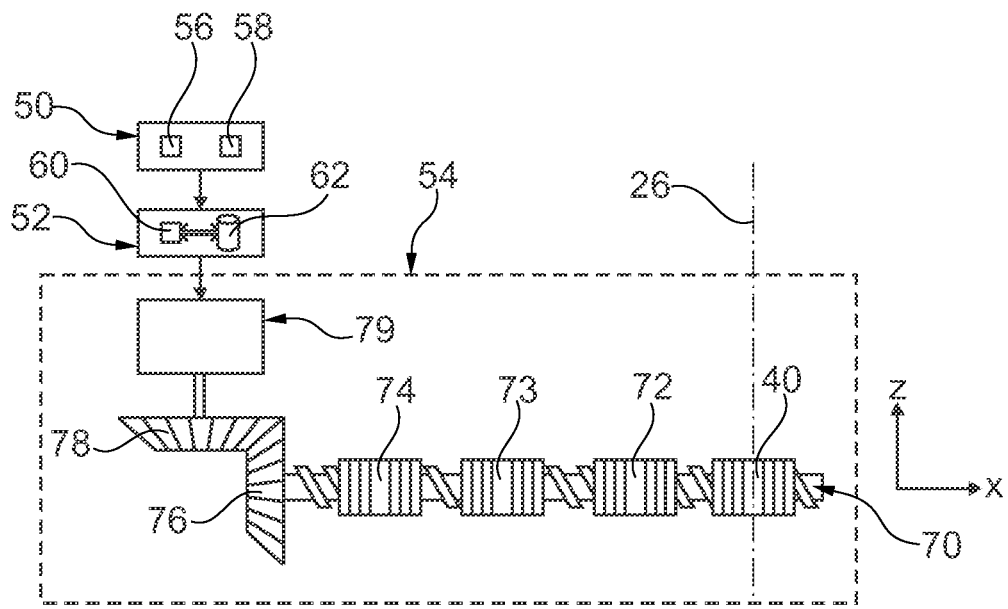
FIG. 5 is a schematic illustration of a device for turning the rollers of the device in FIG. 1.

FIG. 5 represents the different elements of the skate 6 implemented in order to maintain the rolling plane of each of the rollers 20 to 23 parallel to the direction VD during braking. For this purpose, the skate 6 comprises:
- an inertia system 50 which can measure physical values representative of the angles $\alpha_B$ and $\alpha_I$, i.e. physical values on the basis of the values of these angles $\alpha_B$ and $\alpha_I$ can be determined;
- a central unit 52, which establishes on the basis of the measurements made by the inertia system 50 a command for pivoting of the rollers 20 to 23 around their respective axis of pivoting; and
- an electromechanical turning device 54 which can make each of the rollers 20 to 23 pivot simultaneously around their respective axes of pivoting, by an angle imposed by the pivoting command established by the central unit 52.

The inertia system 50 is secured without any degree of freedom on the sole 8. Typically, the inertia system 50 comprises a triaxial gyrometer 56 and a triaxial accelerometer 58. The gyrometer 56 measures the angular speed of rotation of the sole 8 around three non-co-linear axes, which are advantageously orthogonal to one another. For example the measurement axes of the gyrometer 56 are parallel to the directions X, Y and Z. Similarly, the measurement axes of the accelerometer 58 are preferably parallel to the directions X, Y and Z. The accelerometer 58 makes it possible to measure the direction VD whereas the integration of the measurements of the gyrometer 56 makes it possible to calculate the angles $\alpha_B$ and $\alpha_I$.

The central unit 52 typically comprises a programmable electronic computer 60 which can execute instructions recorded on a data recording support. For example, this computer is a programmable microprocessor. For this purpose, the central unit 52 also comprises a memory 62, such as non-volatile memory, which contains the instructions necessary to execute the method in FIG. 13.

Typically, the inertia system 50 and the central unit 52 are accommodated in a protective casing 53 (FIG. 1) which is secured without any degree of freedom on the sole 8. This casing 53 also comprises a supply source, in order to supply all of the electrical components necessary for the operation of the skate 2. For example, the supply source is a battery.

Figure 6:
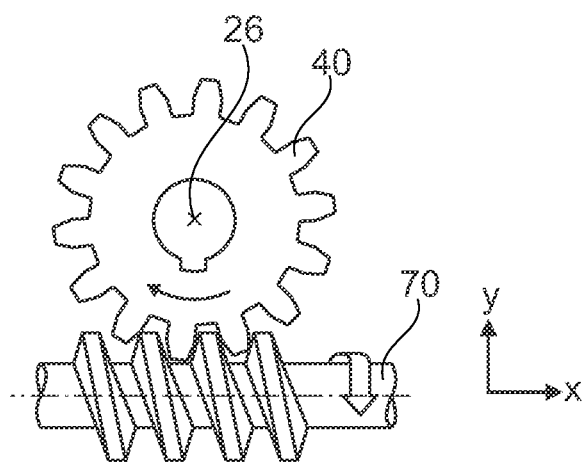
FIG. 6 is a schematic illustration in a view from above of a part of the turning device in FIG. 5.
Figure 7:
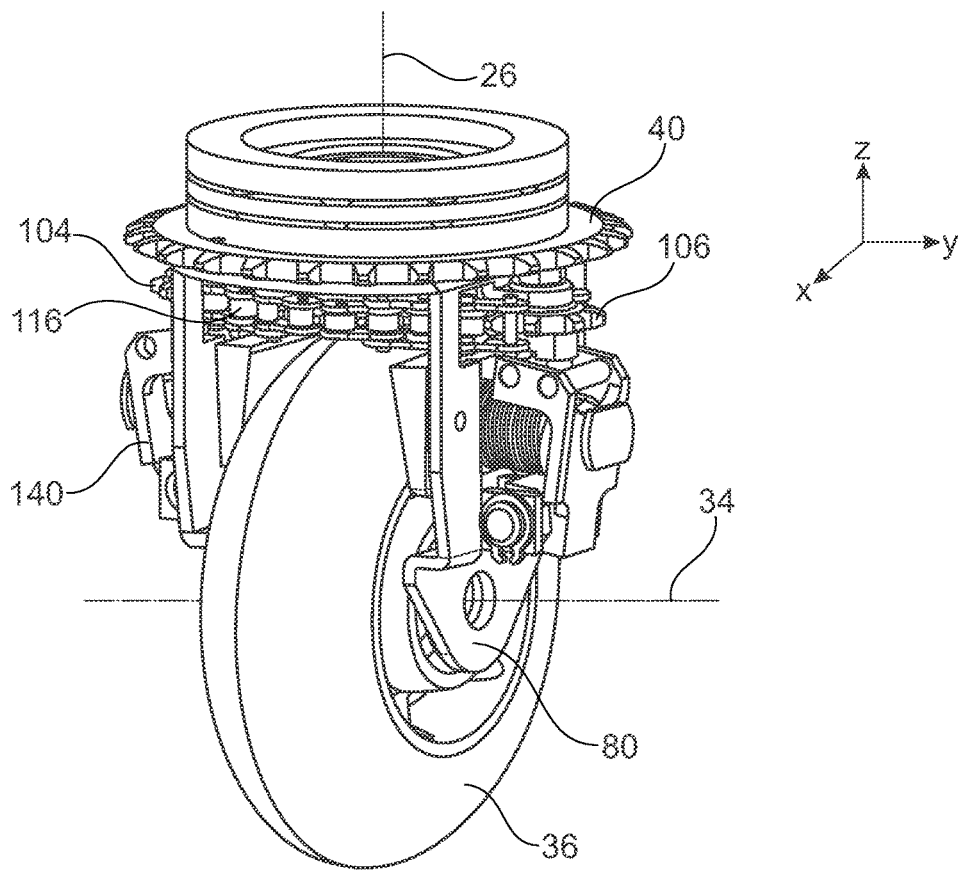
FIG. 7 is an illustration in perspective of the braking device in FIG. 3.

The device 54 is a controllable electrical device which can make the rollers 20 to 23 pivot simultaneously in response to the pivoting commands transmitted by the central unit 52. For this purpose, this device 54 comprises an endless screw 70 which extends parallel to the axis 16 of the sole 8. This screw 70 is situated below the sole 8, and engages directly and simultaneously each of the notched wheels of the rollers 20 to 23. In FIG. 6, the notched wheels of the rollers 21 to 23 have respectively the numerical references 72, 73 and 74. The engagement of the notched wheel 40 with the screw 70 is represented in greater detail in FIG. 6. The screw 70 turns around itself, around its longitudinal axis which extends parallel to the axis 16.

A conical or frusto-conical notched wheel 76 is secured without any degree of freedom on a proximal end of the screw 70. The axis of revolution of this wheel 76 coincides with the longitudinal axis of the screw 70.

The wheel 76 engages directly another conical or frusto-conical notched wheel 78, the axis of revolution of which is perpendicular and parallel to the direction Z.

The device 54 also comprises a controllable electrical actuator 79 which rotates the notched wheel 78 around its axis of revolution. The actuator 79 is controlled by central unit 52. For example, the actuator 79 is an electrical step motor or the like.

FIGS. 7 to 10 represent the braking device 42 and the roller 20 in greater detail.

The roller 20 comprises the fork 80, which is secured at its upper end and without any degree of freedom on the notched wheel 40. The axis 34 for its part is integral without any degree of freedom with the lower end of the fork 80.

The notched wheel 40 is fitted such as to be free in rotation around the axis 26. For this purpose, the sole 8 comprises a vertical axle 82 (FIG. 8) which extends along the axis 26. This axle 82 is secured without any degree of freedom on the sole 8, and extends downwards from its lower face 14.

Figure 8:
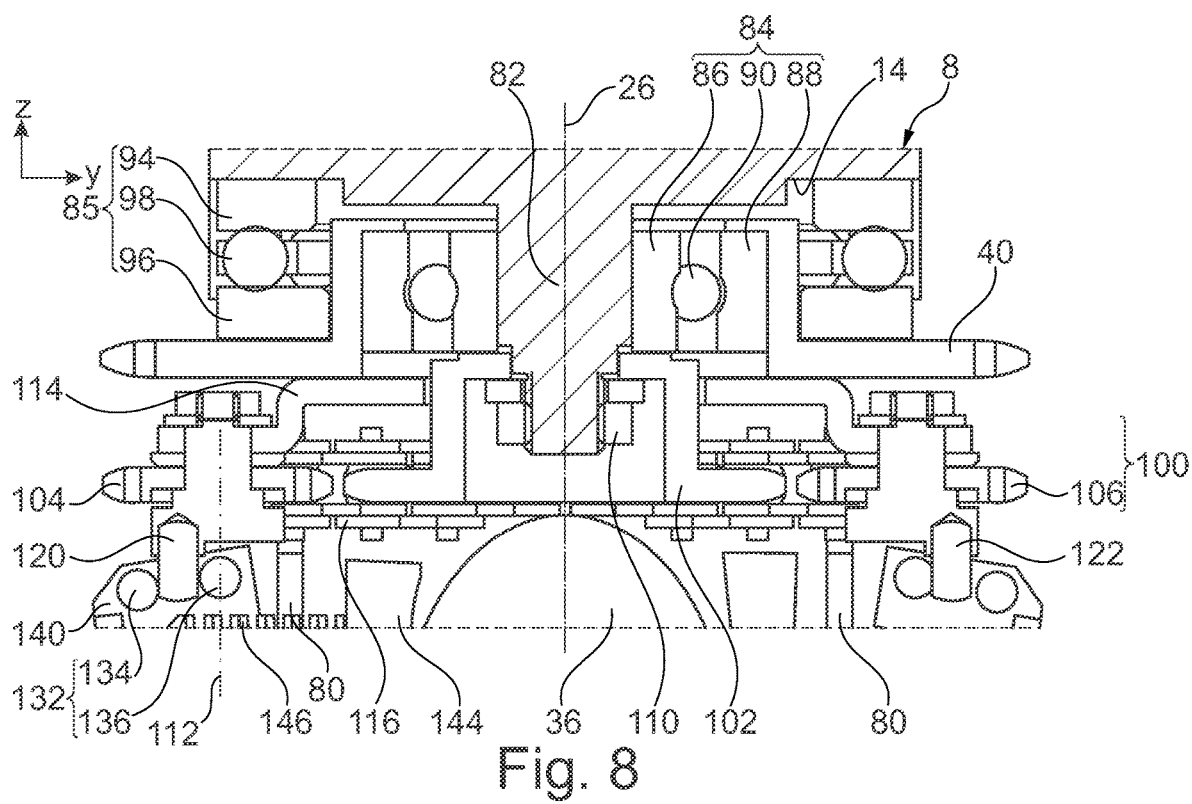
FIG. 8 is a partial illustration in vertical cross section of the braking device in FIG. 7.

The notched wheel 40 is fitted such as to rotate on the axle 82 by means of two ball bearings 84, 85 (FIG. 8). More specifically, the bearing 84 comprises:
- an inner ring 86 which is secured without any degree of freedom on the axle 82;
- an outer ring 88 which is secured without any degree of freedom on the notched wheel 40; and
- balls 90 which are interposed between the rings 86 and 88.

The axis of revolution of the ring 88 coincides with the axis 26.

Because of its position, the bearing 84 transmits radial forces to the sole 8, i.e. mainly horizontal forces applied to the tread 36.

The bearing 85 comprises:
- an upper ring 94 which is secured without any degree of freedom on the lower face 14 of the sole 8;
- a lower ring 96 which is secured without any degree of freedom on the notched wheel; and
- balls 98 which are interposed between the rings 94 and 96.

The axis of revolution of the ring 96 coincides with the axis 26.

Because of its position, the bearing 85 transmits axial forces to the sole 8, i.e. mainly vertical forces applied to the tread 36.

The braking device 42 comprises a planetary gear set 100 (FIGS. 9, 11 and 12) comprising:
- a planetary wheel 102; and
- two satellite gears 104 and 106 which are integral with the fork 80.

In this embodiment, the device 42 is symmetrical relative to the rolling plane R of the roller 20. Consequently, only the central part and the part of the device 42 which is situated on the left-hand side of the plane R are described in greater detail hereinafter.

The axis of revolution of the planetary wheel 102 coincides with the axis 26. In this case, the planetary wheel 102 is secured without any degree of freedom in rotation on the lower end of the axle 82, for example by means of a nut 110 screwed onto this lower end. In this case, the planetary wheel 102 is a notched wheel with a diameter $D_p$ and comprising $ND_p$ teeth.

The satellite gear 104 is fitted free in rotation around a shaft 112, which is mechanically connected without any degree of freedom to the fork 80. For example, the shaft 112 is secured on the notched wheel 40 by a rigid square 114. Thus, when the roller 20 pivots around the axis 26, the shaft 112 also turns around the axis 26. In this case, the shaft 112 is parallel to the axis 26.

The satellite gear 104 is a notched wheel with a diameter $D_s$ and comprises $ND_s$ teeth. In this case, the diameter $D_s$ is equal to $D_p/2$, and the number of teeth $ND_s$ is equal to $ND_p/2$.

The satellite gear 104 is rotated by the planetary wheel 102. For this purpose, the planetary gear set 100 comprises a chain 116 which surrounds the planetary wheel 102 and the satellite gears 104 and 106. The chain 116 engages with the teeth of the planetary wheel 102 and satellite gears 104, 106. Thus, when the wheel 20 pivots around the axis 26 by an angle $\alpha_1$, this gives rise to rotation of the satellite gear 104 by an angle $\alpha_2$. In fact, this gives rise to displacement of the satellite gears 104 and 106 around the planetary wheel 102, which remains immobile. The angle $\alpha_2$ is proportional to the angle $\alpha_1$. More specifically, in this case, because of the ratio between the diameters $D_p$ and $D_s$ and the ratio between the number of teeth $ND_s$ and $ND_p$, the angle $\alpha_2$ is equal to twice the angle $\alpha_1$. Thus, when the roller 20 pivots by 90°, the satellite gears 104 and 106 pivot around their respective axis of rotation by 180°.

The device 42 also comprises a vertical pin 120, the upper end of which is secured without any degree of freedom on the satellite gear 104. The pin 120 is eccentric relative to the shaft 112, such that, when the satellite gear 104 turns by an angle $\alpha_2$ around the shaft 112, the pin 120 turns by the same angle $\alpha_2$ around this same shaft 112. The pin 120 is secured on the satellite gear 104 such that, when the rolling plane R of the roller 20 is parallel to the longitudinal axis 16 of the sole, the pin 120 is in a distant position. In this distant position, the pin 120 is as far as possible from the axis 26. When the satellite gear 104 turns by 180°, the pin 120 moves from its distant position to a close position. In the close position, the pin 120 is as close as possible to the axis 26.

Figure 11:
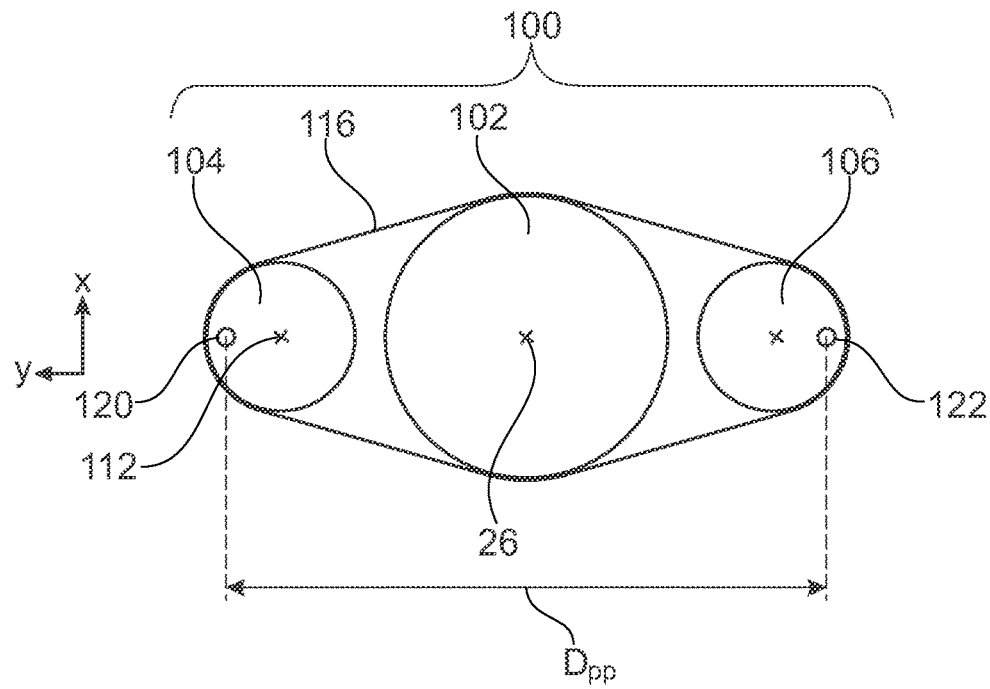
FIGS. 11 and 12 are illustrations in a view from above respectively of the close and distant positions of a pin of the braking device in FIG. 7.
Figure 12:
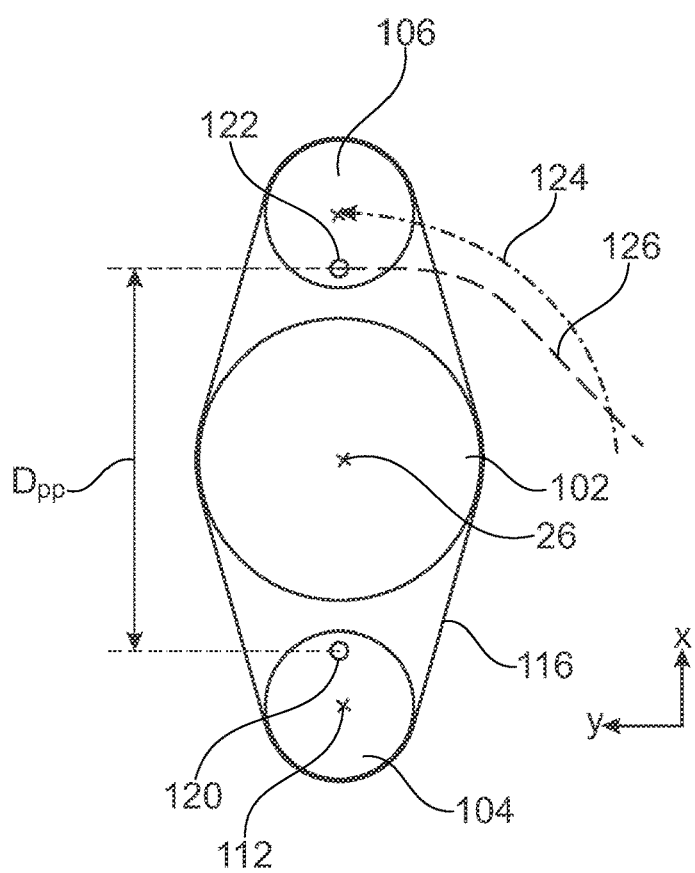

In FIGS. 8, 11 and 12, the pin 120 which is symmetrical relative to the plane R has the numerical reference 122. FIG. 11 represents the pins 120, 122 in their distant position. The distant position of the pins 120, 122 corresponds to the situation where the rolling plane R of the roller 20 is parallel to the axis 16 of the sole. In this situation, the distance $D_{pp}$ which separates the two pins 120 and 122 is maximum.

When the roller 20 pivots by 90°, the axes of revolution of the satellite gears 104 and 106 also pivot by 90° around the axis 26. The situation represented in FIG. 12 is therefore obtained. In the situation in FIG. 12, the rolling plane R is now perpendicular to the axis 16 of the sole 8. In FIG. 12, the line 124 represents the path traveled by the axis of revolution of the satellite gear 106 when going from the situation in FIG. 11 to the situation in FIG. 12. This pivoting of the roller 20 by 90° gives rise to rotation by 180° of the satellite gears 104 and 106 around their respective axis of revolution. The pins 120 and 122 are then both in their close position. In this close position, the distance $D_{pp}$ which separates them is then minimum. The path traveled by the pin 122 in order to go from the situation in FIG. 11 to the situation in FIG. 12 is represented by a line 126.

Figure 9:
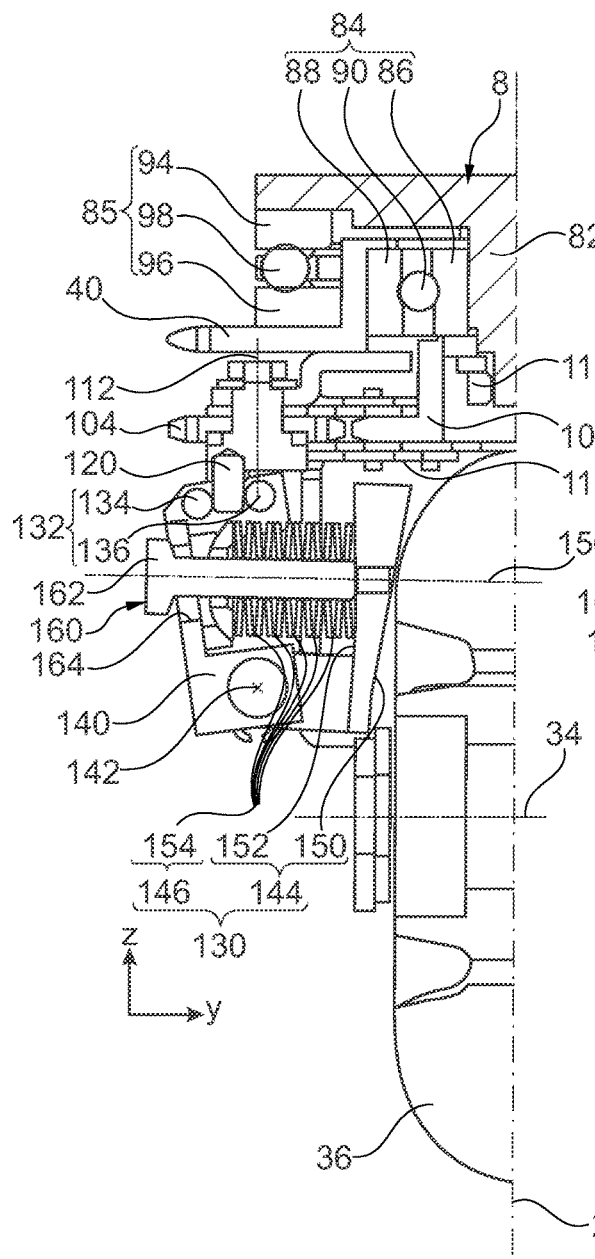
FIGS. 9 and 10 are partial illustrations in perspective of a pad of the braking device in FIG. 7, respectively in a retracted position and in an advanced position.
Figure 10:
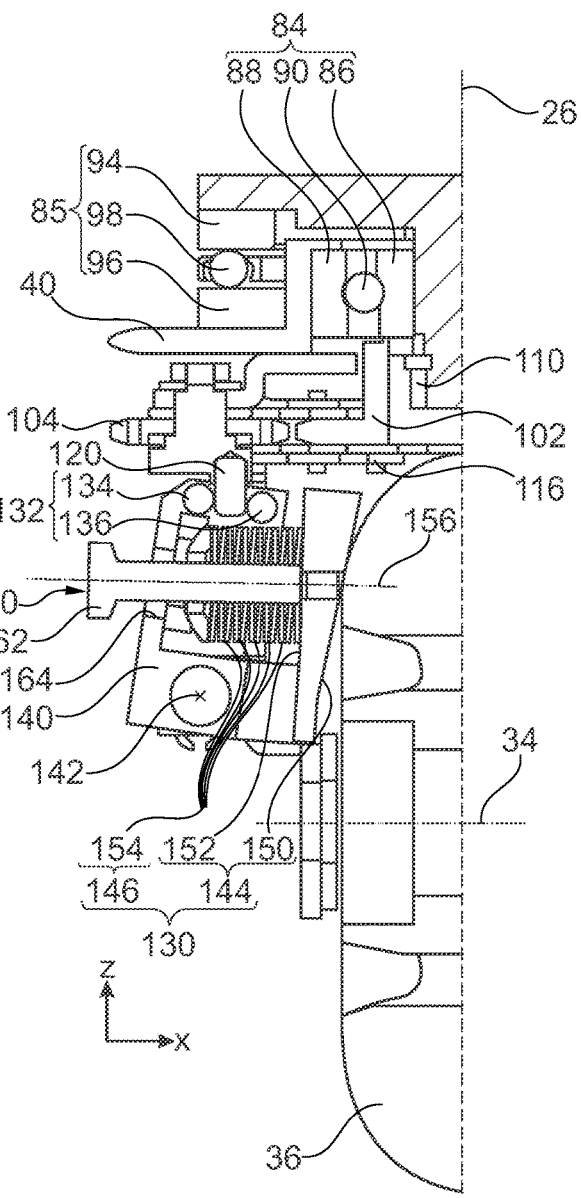

The pin 120 displaces a braking pad 130 between an advanced position represented in FIG. 10, and a retracted position represented in FIG. 9. In the advanced position, the pad 130 rubs and exerts pressure on the flank 38 of the wheel 20, thus braking it. In the retracted position, the pad 130 is separated from the flank 38 of the roller 20 by a gap equal to, or more than, 0.5 mm or 1 mm. Thus, in the retracted position, the pad 130 does not brake the roller 20.

For this purpose, in this case, the lower end of the pin 120 is received in a sliding manner inside a slide 132. The slide 132 extends horizontally parallel to the plane R. For example, the slide 132 is formed by two horizontal rails 134 and 136, which extend parallel to one another along a horizontal direction parallel to the plane R. The lower end of the pin 120 is accommodated between these two rails, such as to slide between these rails 134 and 136 when going from the situation in FIG. 11 to the situation in FIG. 12, and vice versa.

The slide 132 is fitted without any degree of freedom on the upper end of a thruster 140. The lower part of the thruster 140 pivots around a horizontal shaft 142 parallel to the plane R. The shaft 142 is secured without any degree of freedom on the fork 80.

In the distant position of the pin 120 (FIG. 9), the thruster 140 returns the pad 130 to its retracted position and retains it there. In the close position of the pin 120 (FIG. 10), the thruster 140 thrusts the pad 130 into its advanced position and retains it there.

In this embodiment, the pad 130 comprises a rigid runner 144 and a spring 146. The runner 144 comprises:
  a front face 150 facing towards the flank 38 of the roller 20; and
  a rear face 152 situated on the side opposite the front face 150.

The front face 150 rubs on the flank 38 when the pad 130 is in its advanced position, and does not rub on this flank 38 when the pad 130 is in its retracted position. When it is displaced, the runner 144 turns around the shaft 142. For this purpose, the lower end of the runner 144 is fitted free in rotation around the shaft 142. The runner 144 turns around the shaft 142 independently from the thruster 140.

The spring 146 transforms the displacement of the pin 120 towards its close position into pressure exerted on the rear face 152 of the runner 144. For this purpose, the spring 146 is supported on one side on the rear face 152, and on the opposite side on the thruster 140. In this case, the spring 146 is composed of a stack of spring washers 154 aligned along a horizontal axis 156 perpendicular to the plane R. The advantage of using a stack of spring washers 154 is that it is then easy to adjust the rigidity of the spring 146 by adding or removing spring washers 154.

In order to return the pad 130 from its advanced position to its retracted position, the device 42 also comprises a rod 160, one end of which is secured on the rear face 152 of the runner, and the other end 162 of which is widened. The body of the rod 160 is received in a sliding manner inside a hole 164 which passes through the thruster 140. In this case, the rod 160 extends horizontally along the axis 156. When the pin 120 is displaced to its distant position, the widened end 162 of the rod 160 is supported on the thruster 140, such that the rotation of the thruster 140 returns the pad 130 to its retracted position.

In this embodiment, the rod 160 is also used to retain the spring washers 154 stacked on one another. For this purpose, the rod 160 also passes through the center of each of these spring washers 154.

Figure 13:
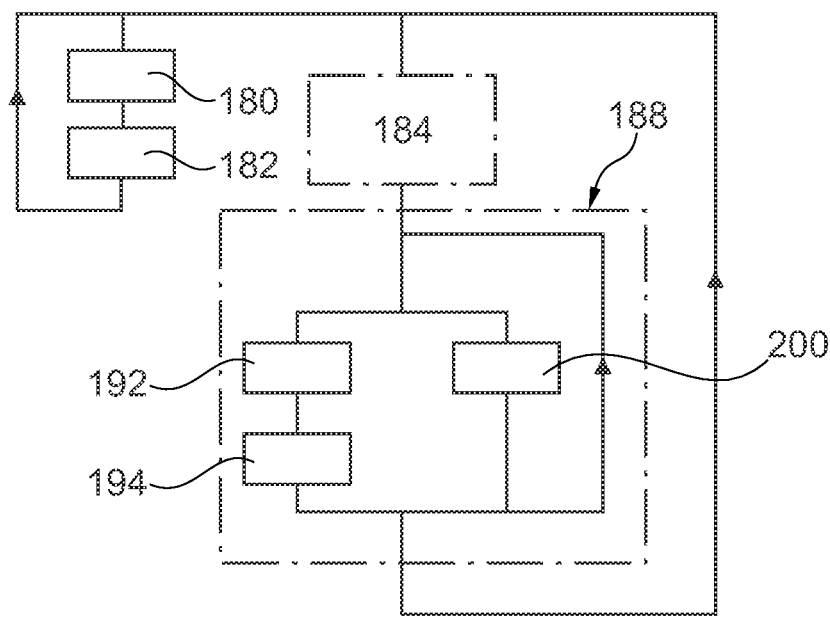
FIG. 13 is a flowchart of a method for operation of the device in FIG. 1.

The operation of the device 2 will now be described with reference to the method in FIG. 13.

Initially, the user puts on each of the skates, then starts to skate in order to travel on the ground 4.

Starting from this moment, during a step 180, the inertia system 50 continually measures the angular speed and the acceleration of the sole 8 around the directions X, Y and Z, then transmits each of these measurements to the central unit 52.

During a step 182, the central unit 52 acquires these measurements in order to process them. In particular, the central unit 52 calculates the values of the angles $\alpha_I$ and $\alpha_B$. The steps 180 and 182 are reiterated continually for as long as the device 2 is being used.

In parallel, the user starts with a phase 184 of acceleration or travel at constant speed during which he does not want to brake. For example, the user travels by carrying out what is known by the expression "skating steps". During the execution of the skating steps, each time a skate rolls on the ground 4, the axis 16 and the direction VD are aligned. Thus, during this phase 184, the central unit 52 retains the rollers in their aligned position at least when they are rolling on the ground 4. Consequently, during this phase 184, no braking torque is exerted on the roller 20 by the device 42. The pads 130 are thus retained in their retracted position.

When the user wishes to brake, he turns his skates suddenly such that the angle $\alpha_B$ and optionally the angle $\alpha_I$ vary suddenly. A sudden variation of one of these angles $\alpha_B$ or $\alpha_I$ is in this case interpreted by the central unit 52 as the indication that the user wishes to brake. Consequently, the phase 184 is interrupted and is followed by a braking phase 188.

During the phase 188, and more specifically during a step 192, the central unit 52 establishes a command for pivoting of the rollers 20 to 23, in order to maintain their respective rolling planes parallel to the direction VD. For example, for this purpose, the central unit 52 establishes a pivoting command which makes each of the rollers 20 to 23 pivot around its axis of pivoting by an angle $-\alpha_B$ opposite the angle $\alpha_B$ calculated. This pivoting order is incorporated in the pivoting command which is transmitted to the turning device 54, and more specifically to its actuator 79.

During a step 194, in response, the actuator 79 makes the notched wheel 78 turn by an angle corresponding to the order contained in the pivoting command received. The rotation of the notched wheel 78 gives rise to corresponding rotation of the screw 70, by means of the notched wheel 76. The rotation of the screw 70 around itself simultaneously rotates all the notched wheels 40 and 72 to 74. This therefore gives rise to simultaneous pivoting of each roller 20 to 23 around its respective axis of pivoting, which maintains the rolling plane of each of these rollers parallel to the direction VD. In these conditions, the sole 8, and more specifically the axis 16 of this sole, is no longer parallel to the direction in which the rollers 20 to 23 are rolling.

In addition, in parallel with the steps 192 to 194, during a step 200, because of the pivoting of the roller 20, the device 42 brakes the roller 20 with a braking torque which is proportional to the absolute value of the angle $\alpha_B$.

When the user no longer wishes to brake, he displaces the skate 6 in order to align its longitudinal axis once more in the direction VD, and maintains the sole 8 parallel to the ground 4. In these conditions, the angles $\alpha_B$ and $\alpha_I$ are canceled out. Then, the execution of the step 194 returns the rollers 20 to 23 to their aligned position. Similarly, execution of the step 200 leads to a zero braking torque. More specifically, the device 42 returns the pad 130 to its retracted position, such that it is no longer exerting any pressure on the roller 20.

The braking phase then ends, and the user returns to the phase 184 of travel.

It will be noted that the device 2 allows the user to brake in "snow plow" mode, i.e. by placing the skates in the same position as he would have done to brake in snow plow mode with skis or ice skates.

Figure 14:
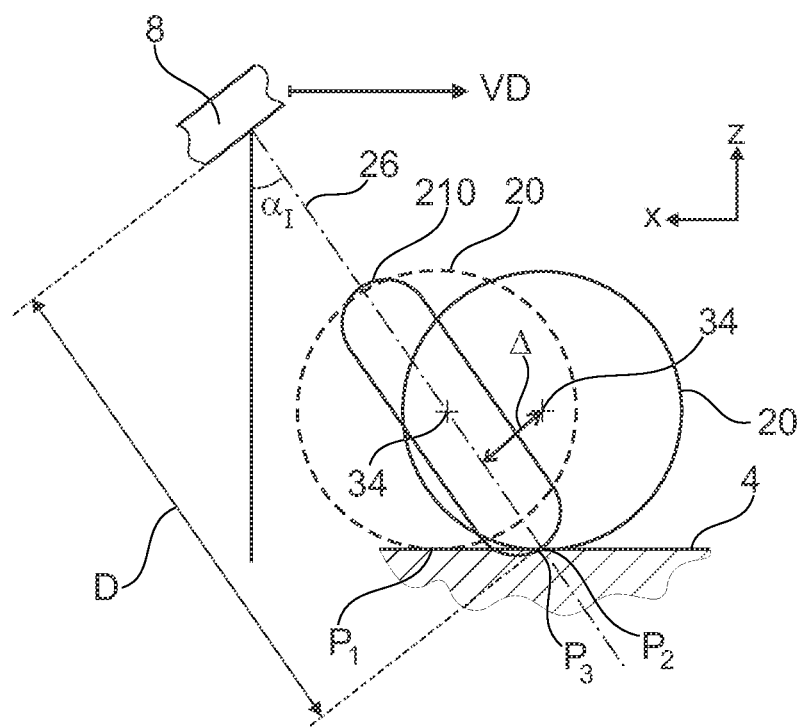
FIG. 14 is a schematic illustration of the roller in FIG. 3, used to explain the advantage of offsetting of the rolling axis of this roller relative to its axis of pivoting.

In another embodiment, represented schematically in FIG. 14, the shortest distance $\Delta$ between the axes 26 and 34 is non-zero. In this case, the distance $\Delta$ is selected such that the point of contact between the ground 4 and the roller 20 is as close as possible to the position of the point of contact which would be obtained by maintaining the roller 20 blocked in the aligned position.

FIG. 14 represents schematically the roller 20 and a part of the sole 8 in a situation where the direction VD is horizontal, and the angle $\alpha_B$ is equal to 90°. In this figure, the rolling plane of the roller 20 is parallel to the direction VD. The position of the roller 20 in the case when the distance $\Delta$ is non-zero is represented in a solid line. The position of the roller 20 in the case when the distance $\Delta$ is zero is represented in a broken line. The position of a roller 210 is also represented in a solid line by an oblong form. The roller 210 is identical to the roller 20, except that its rotation around the axis 26 is blocked in the aligned position. Consequently, the position of the roller 210 corresponds to that which is observed with a known skate, when the user inclines the sole of the skate in order to slide in the direction VD perpendicular to the longitudinal axis of the sole, so as to brake rapidly.

The points $P_1$ and $P_2$ correspond to the positions of the points of contact between the roller 20 and the ground 4, respectively in the position represented in a broken line and the position represented in a solid line. The point $P_3$ corresponds to the position of the point of contact between the roller 210 and the ground 4. For the purpose of simplification, in the first approximation the position of the point $P_3$ coincides with the intersection of the axis 26 and the ground 4.

In FIG. 14, it is found that a zero distance $\Delta$ corresponds to a point $P_1$ which is distant from the point $P_3$ in the direction VD. On the other hand, when the distance $\Delta$ is non-zero, the point $P_2$ approaches the point $P_3$ in the direction VD. There is also a value $\Delta p$ of the distance $\Delta$ for which the distance between the points $P_2$ and $P_3$ in the direction VD is zero as represented in FIG. 14. Minimizing this difference between the points $P_2$ and $P_3$ in the direction VD is advantageous, since this makes the use of the skate 6 more intuitive, and similar to that of known skates. The value $\Delta p$ which cancels out the difference between the points $P_2$ and $P_3$ in the direction VD is given by the following equation: $\Delta p = D*\sin(\alpha_I)/\sin(\alpha_B)$, where D is the distance between the lower face 14 of the sole 8 and the ground 4 along the axis 26. This value $\Delta p$ varies according to the values of the angles $\alpha_I$ and $\alpha_B$. However, in this embodiment, the distance $\Delta$ is constant. Thus, in order to minimize this difference between the points $P_2$ and $P_3$ in most situations of use, the distance $\Delta$ is in this case equal to $D*\sin(\alpha_{IC})/\sin(\alpha_{BC})$, to within more or less 20%, or more or less 10%, or more or less 5%, where $\alpha_{IC}$ and $\alpha_{BC}$ are equal respectively to 20° and 30°. The values $\alpha_{IC}$ and $\alpha_{BC}$ correspond to mean values observed on known skates during braking by sliding.

Typically, this distance $\Delta$ is then greater than 1 cm, 2 cm or 3 cm. Preferably, during use of the skate 6, the axis 34 is in front of the axis 26 in the direction of displacement of the sole 8. For example, the distance D is equal to 90 mm, which results in a distance Δ equal to 61.5 mm.

Variants of the Roller:

A shock absorber can be accommodated between each roller and the sole in order to dampen the bumps and unevenness of the ground. A shock absorber of this type typically introduces an additional degree of freedom of displacement of the roller relative to the sole in the direction Z.

Nor is it necessary for the rollers to be always entirely situated below the sole, as in the examples previously described. In fact, it is sufficient for at least part of the tread of the roller to be below the sole. The other part of the tread can extend above the sole, through a receptacle provided for this purpose in this sole.

There can be any number of rollers. For example, as a variant, the locomotion device comprises only a single roller, or two rollers, or more.

Variants of the Turning Device:

Control of the braking torque according to the angle $α_I$ can be omitted. In this case, the skate 6 can be simplified. In particular, the measurement of the angle $α_I$ can be omitted.

The notched wheel 40 can be replaced by a single notched angular sector.

According to another embodiment, the turning device comprises an actuator for each of the rollers which rotates the roller directly around its axis of pivoting. In this case, the endless screw 70 and the notched wheels 40 and 72 to 74 are omitted.

In addition to the rollers, the turning angle of which is controlled by the turning device, the locomotion device can comprise additional free rollers. These free rollers are fitted such as to be free in rotation around their respective axes of pivoting. Preferably, the rolling axis of these free rollers is also offset by a non-zero distance Δ from their axis of pivoting, in order for them to be aligned automatically without the assistance of an electrical actuator on the instantaneous direction of displacement of the device. For example, one of these free rollers can be used to measure the angle $α_B$. It is possible to associate the braking device 42 with this free roller.

According to a particular embodiment, the locomotion device comprises only free rollers. In this case, the turning device 54, the inertia system 50, and the central unit 52, can be omitted.

According to another embodiment, the orientation of the roller 20 is not controlled on the basis of the measurements by the inertia system 50. For example, the inertia system 50 is replaced by a mechanical device for orientation of the rollers.

The central unit 52 can comprise one or a plurality of electronic computers.

In the case of the skates previously described, and in the more general case when the device comprises a first and a second sole which are mechanically independent from one another in order each to receive a respective foot of the user, the first central unit which is secured on the first sole and the second central unit which is secured on the second sole comprise respectively a first and a second emitter-receiver. These emitters-receivers permit an exchange of data between the first and the second central units. For example, the first central unit transmits to the second central unit data concerning the braking torque and/or the turning angle which it controls. In response, the second central unit takes the data received into account in order to determine the braking torque and/or the turning angle to be applied to the rollers which are secured on the second sole. For example, thanks to the data transmitted, the difference between the braking torques applied to the rollers which are secured on each of the soles is limited. These emitters-receivers are typically wireless emitters-receivers, such as radiofrequency, Bluetooth or Wi-Fi emitters-receivers.

The central unit 52 can be programmed differently. For example, as a variant, during the phase 184, the unit 52 controls the devices 54 in order to maintain the rollers 20 to 23 in the aligned position. As soon as the unit 52 detects that the user wishes to brake, in response it immediately proceeds to the phase 188, during which it maintains the rolling plane of each roller aligned in the direction VD, and, at the same time, brakes each roller as previously described. For example, the unit 52 detects that the user wishes to brake when the angle $α_B$ varies suddenly. A sudden variation of the angle $α_B$ can be detected by comparing continually the drift on a time basis of the angle $α_B$ from a predetermined threshold SB. Until this threshold SB is exceeded, the unit 52 remains in the phase 184 where the rollers are maintained in the aligned position. As soon as this threshold SB is exceeded, the unit 52 proceeds to the phase 188.

The inertia system 50 can comprise additional sensors such as, for example, a triaxial magnetometer. These additional sensors measure additional information which is transmitted to the central unit 52. The central unit 52 can use this additional information concerning the displacement of the sole 8 in order to improve the determination of the angle $α_B$ or $α_I$. This central unit can also use this additional information in order to establish pivoting commands which also depend on its orientation in the earth's magnetic field.

As a variant, the gyrometer 56 is replaced by a gyroscope which measures the rotation around the directions X, Y and Z directly, rather than the angular speed around these directions.

The supply source of the casing 53 can comprise an energy recuperation system which makes it possible to generate electricity in order to supply the turning device with power. For example, the energy recuperation system comprises photovoltaic panels or a dynamometric machine, the rotor of which is rotated by the rotation of the rollers around their respective rolling axis. The energy recuperation system can be used to supply the braking and turning devices directly with power, or simply to recharge a battery.

The energy recuperation system can also use other sources of energy which are present in the environment where the locomotion device is used, such as, for example, the vibrations of the wheels caused by irregularities of the ground on which the device is traveling.

The casing 53 can be placed in a location other than behind the shoe 12. For example, the casing can be accommodated on or below the sole 8. In this case, the movement transmission mechanism of the actuators is adapted according to this new position of the casing. In particular, the use of frusto-conical notched wheels may become unnecessary depending on the position of the casing.

Variants of the Braking Device:

An example of the braking device 42 can be associated with only one, or only some, or all of the rollers 20 to 23. For example, only one example of the device 42 is associated with the rollers 20 and 23 in order to brake them. The other rollers 21 and 22 are not braked, and are without a braking device.

The chain 116 can be replaced by another mechanism for transmission of movement between the planetary wheel 102 and the satellite gears 104 and 106. For example, in another embodiment, the planetary wheel and satellite gears are replaced by pulleys, and the chain 116 is replaced by a belt which is or is not notched. The chain 116 can also be replaced by intermediate notched wheels.

According to another possible variant, the teeth of the satellite gears 104, 106 are engaged directly with the teeth of the planetary wheel 102. In this case, the chain 116 is omitted. Preferably, in this variant, the planetary gear set is accommodated inside a housing in order to prevent dirt from being introduced between the teeth of the planetary wheel and satellite gears.

The ratio between the diameters $D_s$ and $D_p$ can be different from that described above. For example, in a particular embodiment, the diameters $D_s$ and $D_p$ are equal. In this case, the braking torque is maximum when the roller 20 has turned by 180°, i.e. when the device is displaced in rearward operation. More generally, the ratio between the diameters $D_s$ and $D_p$ can be freely adjusted so that the maximum braking torque takes place for a predetermined angle $\alpha_1$. Thus, it is also possible to have situations where the diameter $D_s$ is strictly larger than the diameter $D_p/2$ or $D_p$, or on the contrary strictly smaller than $D_p/2$.

As a variant, the rotational shaft 112 of the satellite gear 104 is not parallel to that of the planetary wheel 102. For example, the shaft 112 is horizontal. For this purpose the wheels 102 and 104 are frusto-conical or conical wheels which are directly engaged with one another, as described for the wheels 78 and 76. In this case, the pin 120 is displaced vertically between its close and distant positions. The pad 130 is then for example also displaced vertically between its retracted and advanced positions. For example, the pad 130 is then situated above the roller 20, and is supported on the upper part of the roller 20 in its advanced position.

The pad 130 can be articulated in rotation around a rotational shaft different from the shaft 142. In this case, the axes of rotation of the thruster 140 and of the runner 144 are preferably both parallel to the rolling plane R, but not necessarily parallel to one another.

According to another variant, the pad 130 is not fitted such as to rotate around an axis of rotation. For example the pad 130, and in particular the runner 144, is only displaced in translation along the axis 156 by rails or similar mechanisms.

The pad 130 can also be secured without any degree of freedom on the thruster 140. In this case, the spring 146 and the rod 160 are omitted, and the runner 144 is made of an elastomer material which also fulfils the function of the spring 146. Typically, it is the resilience of the elastomer material which then allows the runner to be deformed reversibly when the pin 120 advances further towards its close position, whereas the front face of the runner is already supported on the flank 38 of the roller 20.

As a variant, the pad 130 does not rub on the flank 38 of the roller 20, but directly on the tread 36. For example, in this case, the braking device is the same as that previously described, except that the rotational shaft 112 of the satellite gears 104, 106 is contained in the rolling plane R of the roller 20. In addition, the different parts which are displaced by each satellite gear 104, 106, such as the thruster 140 and the pad 130, are displaced by 90° around the axis 26. Thus, in this embodiment, the pads are also contained in the rolling plane R, and, in the advanced position, rub directly on the tread 36.

According to another embodiment, the braking device comprises a return block supported on one side on the fork 80, and on the opposite side on the pad 130, such as to exert continually a return force which returns the pad 130 to its retracted position. In this embodiment, the rear rail 134 of the slide 132 can be omitted, if the return block is in itself sufficient to return the pad 130 automatically from its advanced position to its retracted position.

The pin 120 can be connected to the satellite gear 104 by means of an arm, one end of which is secured without any degree of freedom on the satellite gear 104, and the opposite end of which is secured without any degree of freedom on the upper end of the pin 120. Thus, this arm turns at the same time as the satellite gear 104. For example, the length of this arm is longer than the radius of the satellite gear 104, such that the pin 120 is situated beyond the periphery of this satellite gear 140. This arm then makes it possible to increase the clearance of the pin 120 between its distant and close positions.

As a variant, the braking device 42 is not symmetrical relative to the rolling plane R. For example, in order to limit its size, the braking device comprises only a single pad. For this purpose, the part which is situated to the right or to the left of this plane R is omitted. In this case, the planetary gear set 100 then comprises only the planetary wheel 102, and only a single satellite gear 104. Alternatively, the braking device can comprise more than two pads which can rub on the same roller.

Other Variants:

As a variant, the locomotion device comprises a mechanism for adjustment of the distance Δ. For example, this mechanism is a mechanism with a sliding rail or a slide which makes it possible to adjust the distance Δ even during use of the locomotion device. In this case, preferably, the locomotion device also comprises a controllable electrical actuator which displaces the adjustment mechanism in accordance with a command for adjustment of the distance Δ generated by the central unit 52. Typically, at each command instant, the central unit generates an adjustment command which maintains the distance Δ during the braking equal to the distance $D*\sin(\alpha_t)/\sin(\alpha_B)$.

The locomotion device has been described above in the particular case where a roller skate is involved. However, everything which has been described above applies to any type of locomotion device with rollers used by a user to travel on the ground. In particular, the above description applies to skateboards, scooters, or roller skis. In the case of a skateboard or a scooter, the locomotion device does not comprise a device for attachment of the foot of the user on the sole.

The invention claimed is:

1. A locomotion device with rollers for travel on a ground, the device comprising:
    a sole which extends mainly on a plane, and on which at least one foot of a user is designed to be supported during use of the device by the user;
    at least one roller which is mechanically connected to the sole in order to roll on the ground, the roller being fitted so as to rotate around a rolling axis parallel to the plane of the sole, and also around an axis that pivots perpendicular to the plane of the sole;
    a braking device configured to exert a braking torque on the roller, the amplitude of which varies according to a turning angle, the turning angle being the angle between:
    a longitudinal axis of the sole, the longitudinal axis being set without any degree of freedom for the sole, and contained on the plane of the sole; and
    the orthogonal projection, on the plane of the sole, of the instantaneous direction of displacement (VD) of the sole, the braking device comprising:
- a pad which can be displaced between an advanced position, in which the pad exerts pressure on the roller in order to brake the roller, and a retracted position, in which the pad does not exert any pressure on the roller, or exerts lower pressure on the roller;
- a mechanism which can transform the pivoting of the roller in a direction around its axis of pivoting into displacement of the pad from the retracted position to the advanced position, and pivoting of the roller in an opposite direction around its axis of pivoting into displacement of the pad from the advanced position to the retracted position, wherein the mechanism comprises:

a planetary gear set comprising:

a planetary wheel which is secured without any degree of freedom on the sole, and the axis of revolution of which coincides with the axis of pivoting of the roller; and a satellite gear which is rotated by the planetary wheel around a rotational shaft which is secured without any degree of freedom on the roller; and a pin which can be displaced by the satellite gear between:
- a close position in which the pin thrusts the pad and retains it in the advanced position; and
- a distant position in which the pin permits displacement of the pad from the advanced position to the retracted position.

2. The device as claimed in claim 1, wherein:

the roller comprises:
- a tread configured to come directly into contact on the ground when the roller is rolling on the ground;
- lateral flanks which extend mainly perpendicularly to the tread; and
- the pad is disposed opposite one of the lateral flanks, so as to exert the pressure on the lateral flank in the advanced position.

3. The device as claimed in claim 1, wherein the planetary gear set comprises a belt or a chain which connects the planetary wheel mechanically to the satellite gear, in order to rotate the satellite gear around its axis of revolution in response to pivoting of the roller around its axis of pivoting.

4. The device as claimed in claim 1, wherein a diameter of the planetary wheel is equal to twice a diameter of the satellite gear.

5. The device as claimed in claim 1, wherein the pad comprises:
- a runner with a front face configured to rub directly on the roller when the pad is in the advanced position, and a rear face situated on the side opposite the front face; and
- a spring interposed between the pin and the rear face of the runner, in order to transform the displacement of the pin into pressure exerted by the front face of the runner on the roller.

6. The device as claimed in claim 1, wherein the device additionally comprises:
- a controllable electromechanical device for turning of the roller, the electromechanical device configured to make the roller pivot around its axis of pivoting by an angle which is determined on the basis of a pivoting command received;
- an inertia system configured to measure a physical value representative of the turning angle; and
- a central unit which is programmed, at each instant of the command for pivoting of the roller, and in accordance with the physical value measured by the inertia system at that instant, to establish a pivoting command which maintains the rolling axis of the roller perpendicular to the instantaneous direction of displacement of the sole.

7. The device as claimed in claim 6, wherein the turning device comprises:
- a notched wheel which is secured without any degree of freedom on the roller, and is fitted such as to rotate around the axis of pivoting of the roller;
- an endless screw which is engaged with the notched wheel, and extends parallel to the plane of the sole; and
- an electrical actuator configured to make the endless screw turn by a number of turns determined on the basis of the pivoting command received in order to make the roller pivot by a corresponding angle around its axis of pivoting.

8. The device as claimed in claim 1, wherein the locomotion device can be transported directly by hand by its user.

9. The device as claimed in claim 1, wherein the device comprises:
- two soles which are mechanically independent from one another, a respective foot of the user being designed to be placed by the user on each of the soles during use of the device;
- secured on each sole, at least one roller and the braking device.

* * * * *